April 30, 1957  R. D. TUFFORD  2,790,289
WINDROWER HAVING HAY CRUSHING MEANS
Filed June 30, 1951  2 Sheets-Sheet 2
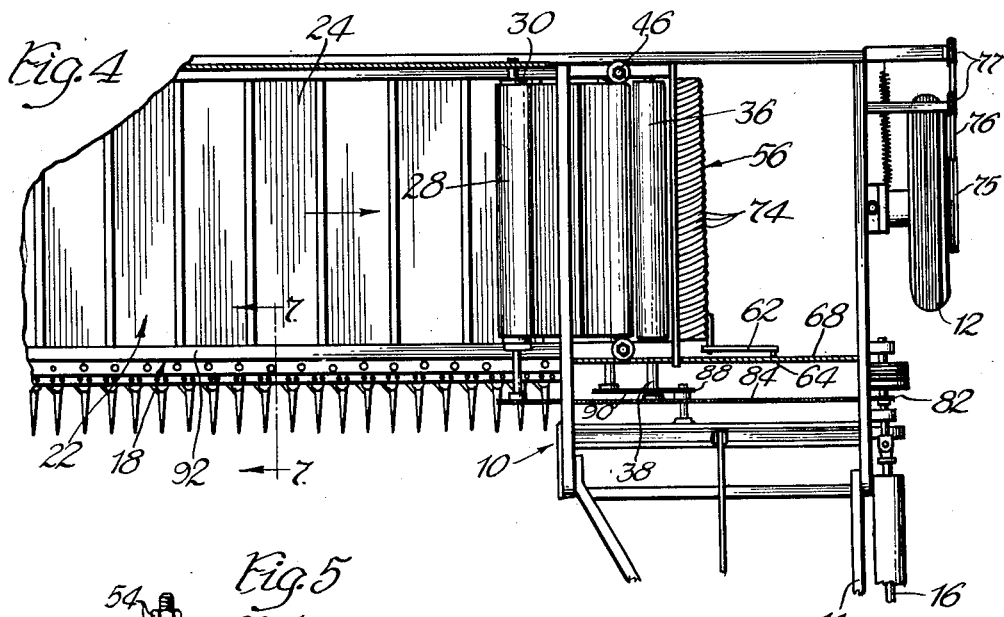
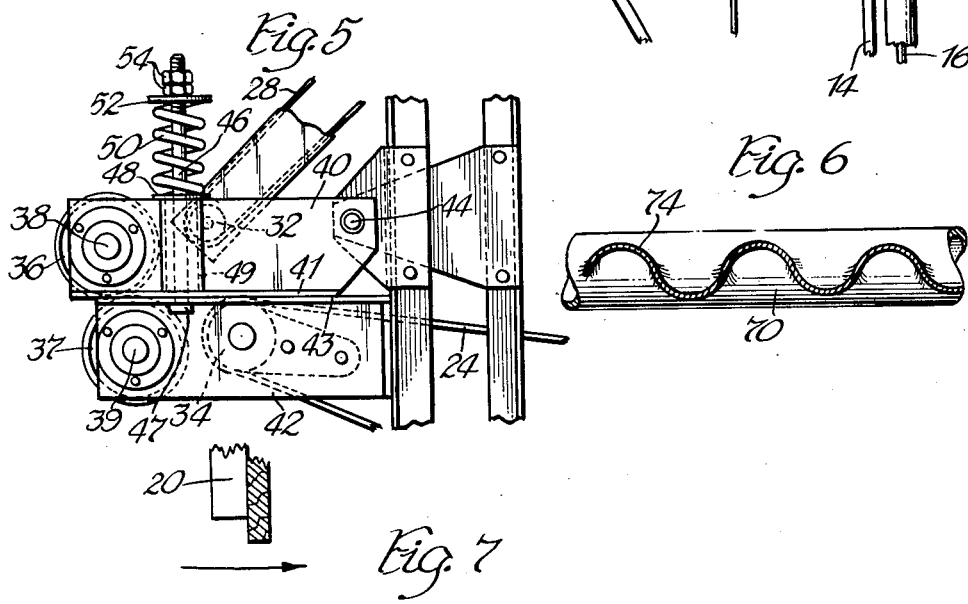
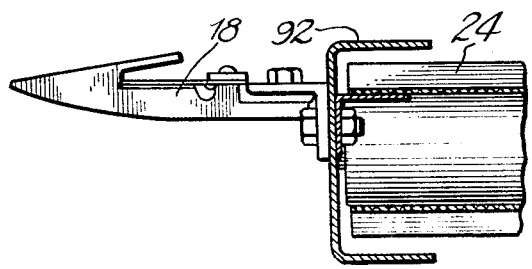
Inventor
Robert D. Tufford
by Bair, Freeman & Molinare
Attys.

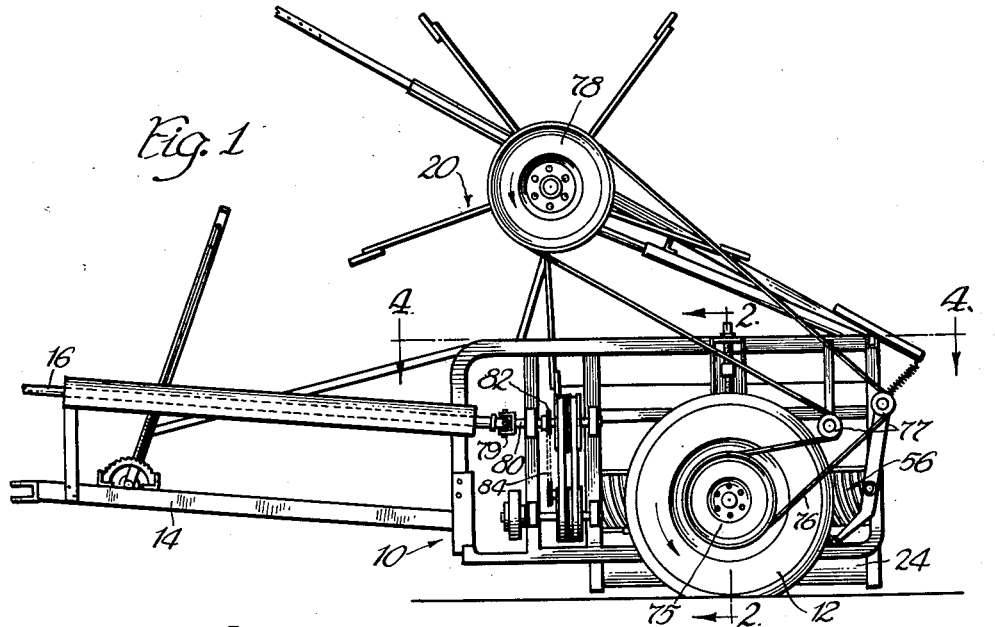
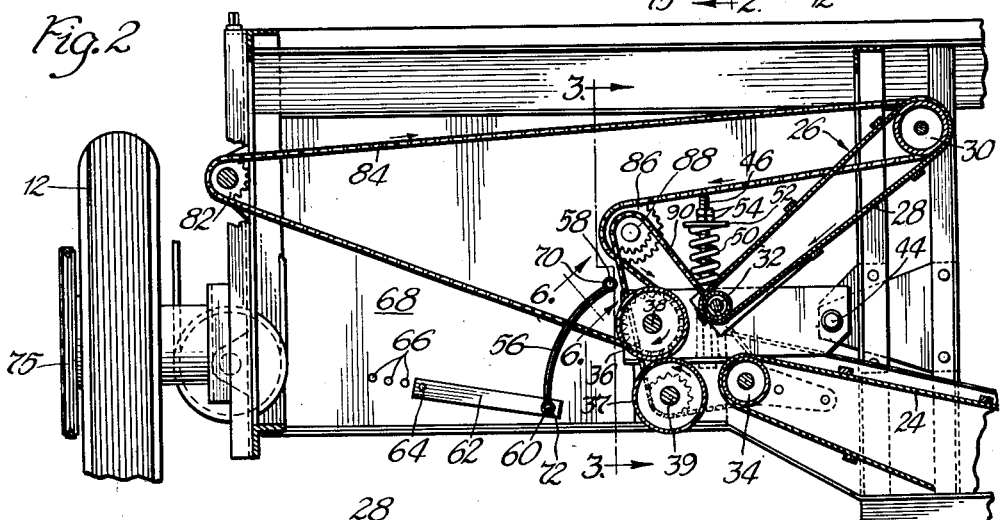
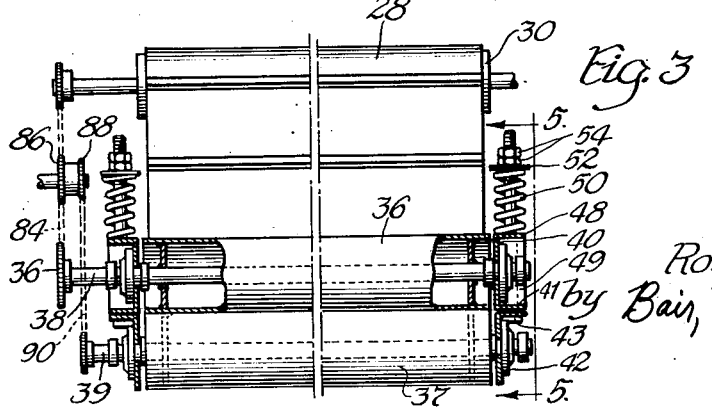

United States Patent Office 2,790,289
Patented Apr. 30, 1957

2,790,289

WINDROWER HAVING HAY CRUSHING MEANS

Robert D. Tufford, Minneapolis, Minn., assignor to Winpower Mfg. Company, Newton, Iowa, a corporation of Iowa Application June 30, 1951, Serial No. 234,571

2 Claims. (Cl. 56—1)

This invention relates to a hay cutting and crushing machine, and more particularly to a hay crushing attachment to a hay cutting machine.

This machine is used in the harvesting of hay crops, and more particularly alfalfa, clover and other coarse stemmed grasses, which are stored or stacked and used some months later as feed for live stock. In this description, the word "hay" is used and is understood to include any of the coarse stemmed material which might be harvested for feed.

In the preparation and harvesting of feed, several important factors are involved. Thus, the hay must be cut at the right time and the hay must always be cured so as to provide for the safekeeping of hay, either by inside storage, outside stacking, or baling. The curing of hay involves a drying process whereby the moisture content within the hay is reduced to less than 20%. The ideal moisture content of cured hay is approximately 14%.

In the ordinary curing of hay, the crop is cut and permitted to lie in the fields, where a natural drying or curing process takes place. Since the stem or stalks of the hay contain the greatest amount of moisture, they naturally require a longer time to cure. By the time the stems or hay stalks become reduced in moisture content, the foilage has become so dry that the leaves and smaller stems become excessively brittle and when the hay is raked or picked up, the leaves and small stems crumble and are lost. The foilage on these hay stalks usually contains the best food elements and vitamins, and consequently the loss of the dried leaves and short stems is undesirable.

The problem has always been to obtain even or uniform curing of the entire hay stalk including the foliage in the shortest possible time, so as to avoid the loss of the valuable leaves by reason of the many weather hazards, which include rain, fog, and heavy dews.

It is generally recognized that extra handling of the hay results in extra losses, not only from the point of time and expense involved but also in the loss of parts of the plant itself. Therefore, it is essential to get the hay into a cured state within the least number of operations.

Common haying methods consist of first cutting the hay into a swath the full width of the cutter bar; second, raking the swath into a windrow and, third, turning or tedding of the windrow with a side delivery rake or tedder, in order to get all the slow drying stems exposed to the sun and air. Through each succeeding operation, there is a loss of a part of the plants. The solution, of course, is to avoid extra handling.

To decrease the drying time of the stems, the idea of crushing or rolling the stems has been used. These crushing machines are usually used as a separate unit from the cutting machine, and they are expensive, to the point of being out of reach of the average farmer. With the present crushing machines, the crushing rollers are positioned parallel to the cutter bar and thus the crushed hay is deposited heterogeneously in a wide swath in the field. Accordingly, in the gathering of the hay after the drying process, additional handling is required, and this results in further losses of the dried foliage.

Thus, one of the objects of this invention is to provide a combination cutting and crushing machine which will in one operation cut the hay stalks and then feed the hay stalks through a crushing machine.

Another object of this invention is to deposit the crushed hay stalks onto the ground in a formed windrow (as distinguished from a heterogeneously deposited, unformed mass of hay), with the leaves and tender foliage on the underside of the deposited swath and with the stems more greatly exposed to the sun and air, so that more uniform drying of the hay stalks is obtained.

A further object of this invention is to provide a hay crusher in combination with existing hay cutting machines, which hay crusher will deposit the crushed hay on the ground in a relatively narrow swath or windrow, whereby the gathering of the dried hay may be accomplished simply and economically.

Still another object of this invention is to provide crushing rollers in combination with a hay cutter and an endless conveyor wherein the crushing rollers are positioned substantially normal to the hay cutter.

Still a further object of this invention is to provide a deflector in combination with a hay cutting and crushing machine, which deflector is adapted to direct the hay onto the ground in a relatively narrow swath, or windrow formation, substantially parallel to the direction of movement of the haying machine.

And still another object of this invention is to modify a hay cutting machine, which includes a cutter and conveyor, by providing a crushing attachment and an auxiliary conveyor for use wtih said cutting machine conveyor, whereby said conveyors cooperate to direct the hay through said crushing attachment.

And still a further object of this invention is to provide a hay crushing machine which is characterized by its inexpensiveness and simplicity of construction and installation.

Further objects and advantages of this invention will become apparent as the following description proceeds and the features of novelty which characterize this invention will be pointed out with particularly in the claims annexed to and forming part of this specification.

A preferred embodiment of the invention is shown in the accompanying drawing, in which—

Figure 1 is a side elevation view of the hay cutting and crushing machine;

Figure 2 is an enlarged sectional elevational view of the machine taken substantially on line 2—2 of Figure 1, which figure is also looking in the direction that the machine moves during the hay cutting operation;

Figure 3 is a view with parts broken away and in section of the crushing rollers and endless belts, taken on line 3—3 of Figure 2;

Figure 4 is a top plan sectional view of the machine taken substantially on line 4—4 of Figure 1;

Figure 5 is an enlarged end view of the crushing rollers and the mounting thereof, and is taken on line 5—5 of Figure 3;

Figure 6 is an enlarged cross section view of the deflector plate and is taken on line 6—6 of Figure 2;

Figure 7 is an enlarged detailed sectional view of the cutter bar, and also showing a portion of the reel spaced thereabove, and is taken on line 7—7 of Figure 4.

Referring now to the drawings, there is shown in Figures 1, 2 and 4 a cutting and crushing machine adapted to be drawn behind a vehicle such as a tractor. The drawing vehicle (not shown) is generally positioned in front of only the right-hand end of the machine, as viewed from above in Figure 4. The left-hand portion of Figure 4 is the cutting portion of the machine and extends laterally of the drawing vehicle.

The cutting and crushing machine comprises a framework generally indicated at 10, mounted on a pair of supporting wheels 12. The framework includes a draw bar 14 which extends forwardly and is adapted to be connected to the drawing vehicle. A power transmission shaft 16 is positioned above the draw bar 14 and is adapted to be connected to a power takeoff on the drawing vehicle.

Referring now particularly to the cutting machine, said cutting machine includes a cutting bar 18 located close to the ground and a reel 20 rotatably mounted above the cutting bar 18. The cutting bar 18 and reel 20 operate and coact in a well known manner. Positioned behind the cutting bar 18 is a conveyor generally indicated at 22, which includes an endless conveyor belt 24 having a substantially horizontally disposed hay-receiving upper run which, as shown in Figure 7, is at substantially the same level as the cutting bar 18, and which moves from left to right when viewed as in Figure 4. The conveyor belt 24 normally discharges the cut hay behind the drawing vehicle.

The crushing portion of this machine is located adjacent the discharge end of the conveyor 22. In order to direct the hay that is being discharged from the conveyor 22 through the crushing portion of the machine, an auxiliary guide conveyor 26 is provided.

This auxiliary guide conveyor is positioned over a portion of the conveyor 22 and includes an endless belt 28 trained over rollers 30 and 32. The side of the belt 28 which faces the conveyor 22 moves laterally in the same direction as does conveyor belt 24. The conveyor 22 and auxiliary conveyor 26 converge to a minimum spacing therebetween at the discharge end of the conveyor 22. The convergence between conveyor 22 and auxiliary conveyor 26 is partially obtained by having the belt 24 trained over a roller 34 which is raised slightly, as shown in Figure 2, above the general level of conveyor belt 24.

The crushing portion of the machine positioned adjacent the discharge end of the conveyor 22 includes a pair of crushing rollers 36 and 37. The length of the crushing rollers 36 and 37 is substantially equal to the width of conveyor belt 24. These crushing rollers 36 and 37 are mounted on shafts 38 and 39 which are respectively journalled in structural members 40 and 42. As seen in Figure 2, the crushing rollers 36 and 37 are disposed so that the bite between the rollers is substantially at the same level as the hay-receiving run of the conveyor. Structural member 42 is welded to framework 10 and thus fixed in position. The structural member 40 is pivotally mounted on framework 10 by means of pins 44 so as to provide for spreading apart of the crushing rollers 36 and 37.

The upper crushing roller 36 is resiliently biased toward the lower crushing roller 37. This resilient biasing means includes a bolt 46 which passes through flange 43 of structural member 42 and engages flange 43 by the head 47 thereof. This bolt 46 also passes through the flange 41 of structural member 40. The resilient biasing force is provided by a spring 50 which is positioned between bearing plates 48 and 52. The bearing plate 48 is supported on member 40 by means of a tubular spacer 49 positioned between and welded to flange 41 and bearing plate 48. A pair of nuts 54 serve as means for adjusting and varying the spring pressure 50.

As shown in Figure 2, a deflector plate 56 is positioned on the discharge side of the crushing rollers 36 and 37. This deflector plate 56 is mounted to swing about a shaft 58. The extended end 60 of deflector plate 56 is secured to an adjustment member 62 which is adapted to be positioned by means of a pin 64 in one of a plurality of positioning holes 66 in a plate 68 which is part of the framework 10.

This deflector plate 56 is composed of a pair of tubes or sleeves 70 and 72 and a plurality of arcuate strips 74. The tube 70 is mounted concentrically on shaft 58 to provide for the pivoting of the deflector plate 54 thereabout. The arcuate strips 74 curve backwardly from sleeve 70 toward sleeve 72, as best shown in Figures 1 and 4, for reasons that are described hereinafter in the description of the operation of the machine.

The driving connections between the various portions of the cutting and crushing machine includes a drive pulley 75 mounted on the axle of supporting wheel 12, and a transmission belt 76. The belt 76 passes over idler pulleys 77 and over a driven pulley 78. The driven pulley 78 is mounted on the shaft of reel 20, and provides for the rotation of reel 20.

The power transmission shaft 16 is connected by means of a universal joint 79 to a drive shaft 80 which has a drive sprocket or pulley 82 mounted thereon. A belt or chain 84 is trained over the drive sprocket 82 and is thereafter trained over a suitable driving member for rotating roller 30. The chain 84 also is trained over a suitable driving member for driving crushing roller 36. This chain 84 further passes over an idling drive sprocket 86 which causes an auxiliary drive sprocket 88 to be rotated. This auxiliary drive sprocket 88 in turn drives an auxiliary belt or chain 90, which causes the crushing roller 37 and conveyor roller 34 to be rotated.

In describing the operation of the cutting and crushing machine, reference is first made to the cutting bar 18, shown in Figs. 4 and 7, which bar 18 has behind the cutting surface thereof, an extra wide stationary surface or shelf indicated at 92, on which the stems, or butt ends, of the plants rest momentarily after they are cut off by the cutter 18. The upper parts, or tops, of the plants are carried backward by the reel 20 and, therefore, the upper parts of the plants fall onto the moving conveyor belt 24 and start in the direction of the crushing rollers 36 and 37, with the stems, or butt ends, lagging behind. This provides that the upper portions of the stems are discharged from the end of the conveyor 22 first and, therefore, these portions of the plants go through the crushing rollers first.

As a consequence, the leaves or tops of the plants are also discharged first onto the ground, leaving the stems at the top of the windrow formation where they are exposed to the best drying elements, the sun and air.

The fact that the bite of the crushing rollers is substantially at the same level as the hay-receiving run of the conveyor, as shown in Figure 2, and that said hay-receiving run is substantially at the same level of the cutting bar, as shown in Figure 7, which cutting bar is close to the ground, provides that the bite of the crushing rollers is close to the ground, as illustrated in Figure 2, wherein the bite of the rollers is shown below the axis of wheel 12. The closeness of the bite of the crushing rollers to the ground provides that the tops of the stalks of hay engage the ground before the butt ends of the hay stalks have passed through the crushing rollers, thereby providing for depositing the hay in a formed windrow as contrasted to a heterogeneously deposited mass of hay.

The curved portions 74 of the deflector plate 56 act to direct the cut hay onto the ground with the lower portions of the stems pointing forwardly in the direction of motion of the cutting machine.

It must be realized that the wide shelf 92 behind the cutting edge of cutter bar 18 is essential in getting the hay stalks to fall onto the conveyor in such a manner that the upper portions of the plants will be put through the crushing rollers first. These features cooperate with the crushing rollers 36 and 37, and deflector plate 56 to cause the hay to lay in a swath with the leaves on the bottom, where they are better protected and preserved, and with the crushed stems on top for quicker drying. These elements also cooperate to provide that the crushed hay is deposited in a relatively narrow swath in one operation and in a position to be easily picked up as soon as it is cured.

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

What I claim as new, and desire to secure by Letters Patent of the United States, is:

1. In a mobile hay crushing machine, which includes, in combination, hay cutting means, conveyor means including a substantially horizontally disposed hay-receiving conveyor run for receiving the cut hay in such a manner that the tops of the hay stalks precede the butt ends thereof as the stalks are discharged from said conveyor means, and crushing means positioned adjacent the discharge end of said hay-receiving run of said conveyor means to receive the cut hay from said conveyor means; the improvement for depositing the crushed hay in a formed windrow with the tops of the stalks at the bottom of the windrow, and with the butt ends of the stalks deposited after the tops and being disposed at an attitude pointing forwardly in the direction of movement of said machine, said improvement comprising, in combination, disposing said hay cutting means close to the ground so that the hay stalks are cut off close to the ground, disposing said conveyor means so that the hay-receiving run of the conveyor means is substantially at the same level as the hay cutting means and maintaining said hay-receiving run of the conveyor substantially at said level, said crushing means including a pair of crushing rollers positioned with their axes extending substantially parallel to the direction of forward movement of said hay crushing machine, said crushing rollers being positioned so that the bite between said rollers is positioned substantially at the same level as the hay-receiving run of the conveyor and at a height above the ground such that the tops of the hay stalks, that are passing between said crushing rollers, engage the ground before the butt ends of the stalks have passed from between said crushing rollers, and a deflector plate for engaging the crushed hay as it is being discharged from said crushing rollers and for assisting in directing said crushed hay down into said windrow formation, said deflector plate being spaced from said crushing rollers and being pivotally mounted for swinging, about an axis parallel to the axes of said crushing rollers, in directions toward and away from the bite of said crushing rollers.

2. A mobile hay-crushing machine as set forth in claim 1, wherein said deflector plate has guide means thereon for guiding the crushed hay, said guide means sloping rearwardly, relative to the forward direction of movement of the mobile hay-crushing machine, from top to bottom along the height of said deflector plate.

References Cited in the file of this patent

UNITED STATES PATENTS

| | | |
|---|---|---|
| 1,791,714 | Conley | Feb. 10, 1931 |
| 1,905,410 | Innes | Apr. 25, 1933 |
| 2,162,783 | Moyer | June 20, 1939 |
| 2,246,361 | Johnson | June 17, 1941 |
| 2,507,635 | James | May 16, 1950 |
| 2,521,999 | Scott | Sept. 12, 1950 |
| 2,609,651 | Cymara | Sept. 9, 1952 |
| 2,664,684 | Russell | Jan. 5, 1954 |
| 2,679,720 | Cymara | June 1, 1954 |